March 5, 1935.   J. L. TRAVERS   1,993,121
ARTIFICIAL EYE
Filed Feb. 8, 1934
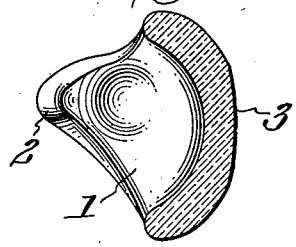
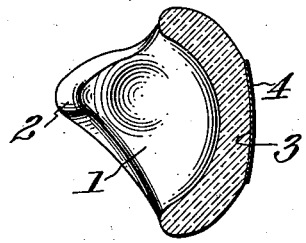
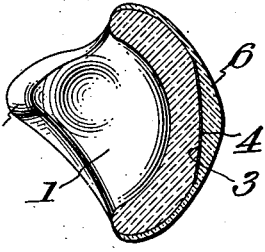
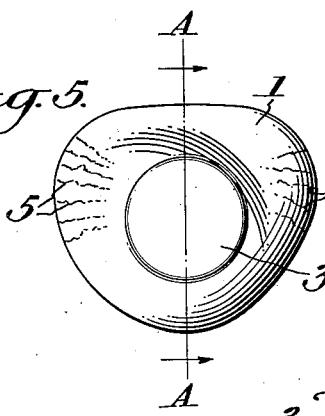
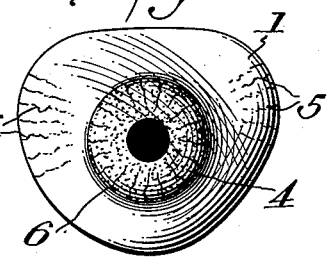
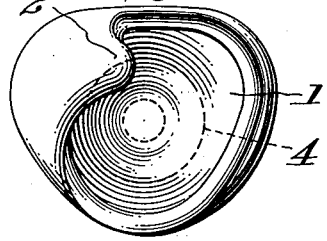
Inventor:
James L. Travers
By Potter Pierce & Scheffler
his Attorneys.

Patented Mar. 5, 1935

1,993,121

UNITED STATES PATENT OFFICE 1,993,121

ARTIFICIAL EYE

James L. Travers, Cleveland, Ohio, assignor to Marvin H. Russell, Cleveland, Ohio Application February 8, 1934, Serial No. 710,343

13 Claims. (Cl. 3—13)

This invention relates to improvements in artificial eyes.

In my application Serial No. 535,321, filed May 6, 1931, I have described an artificial eye construction and a method of making it. The principal feature of the artificial eye of said application is its special shape.

The present invention is not primarily concerned with the special shape of the artificial eye described in said application, although that shape is preferred, but is primarily concerned with the material of which the eye is made and with that part of its construction which concerns the iris. It will be understood from the foregoing that so far as the material of which the eye is made and the construction of the iris are concerned, the invention is not limited to the special shape of the eye described in my prior application and illustrated in the accompanying drawing.

Briefly the present invention resides in the construction of an artificial eye out of a thermoplastic material such as a polymerized olefine derivative and particularly a thermoplastic resin of the vinyl group including resins sold under the trade names "Vinylite", "Gelva" and "Mowalith", and incorporating into the eye construction an iris made by photography, printing, drawing, painting or the like on paper or other suitable material.

It has been proposed heretofore to make artificial eyes out of materials other than glass, such as rubber, celluoid, metals and resins, with a view to overcoming some of the well-known disadvantages of artificial glass eyes, such as their fragility and tendency to explode and become roughened by use, but none of such proposals so far as I am aware has been successful. Practically all artificial eyes up to the present are made of glass.

In accordance with the present invention the material of which the artificial eye is made must be solid and non-plastic at any atmospheric temperature likely to be encountered, but thermoplastic, moldable and weldable at higher temperatures up to temperatures at which organic materials, such as paper, are carbonized, strong, non-fragile, non-porous and sufficiently hard that it does not become scratched in normal use, unaffected by the fluids with which it will contact in the eye socket, and relatively inexpensive. Certain of the resins of the vinyl family meet all of these requirements. (See U. S. patent to Ernest W. Reid, No. 1,935,577.) A preferred resin composition is that described in U. S. patent to Frazier Groff, No. 1,932,889, dated October 31, 1933, it being understood, however, that other specific compositions may be used.

An artificial eye in accordance with the present invention is illustrated in the accompanying drawing in which:

Fig. 1 is a section on the line A—A of Fig. 5 of the translucent body member or ball of the artificial eye.

Fig. 2 is similar transverse section showing the placing of the iris.

Fig. 3 is a similar transverse section showing the application of the cornea.

Fig. 4 is a plan view of the iris.

Fig. 5 is a front plan view of the translucent body portion or ball of the artificial eye.

Fig. 6 is a front plan view of the artificial eye.

Fig. 7 is a rear plan view of the artificial eye.

Referring to the drawing it will be seen that the preferred shape of the eye is in the form of a hollow, substantially spherical or ovate shell of suitable thickness to give it strength and rigidity, with a part of its rear wall removed, leaving a hook shaped projection the purpose of which, as is explained in my earlier application above referred to, is to assist the positioning of the eye in the socket by resting upon the cut-off end or stump of the muscle which controlled the movement of the natural eye. The cavity formed in the rear of the artificial eye also serves to position and to hold the eye in the socket.

The body portion of the eye which corresponds in size, shape (excepting for the cut-away rear portion), and appearance to what is commonly referred to as the eye ball, is molded of translucent vinyl or similar thermoplastic resin which may be suitably colored to match the natural eye, i. e. white with a slight blue or yellow color. This body portion may be manufactured in bulk in different sizes and shapes adapted to fit or substantially fit different people, or they may be molded to measure in the manner commonly followed in making dentures, i. e. by taking an impression of the eye socket and making a mold from the impression. The body member, on account of the character of the material of which it is made, may be readily fitted to the individual eye socket by heating and deforming it, or by cutting or grinding. Also, if necessary, the body member may be built up or enlarged by fusing additional thermoplastic resin onto it. The base may then be provided with vein lines corresponding to those of the remaining natural eye of the person being fitted with the artificial eye. These vein lines may be applied in various ways, for example by applying them with a pen, using a suitable red ink or paint. The next step in the manufacture of the artificial eye is to provide a suitable iris and pupil. This may be done by selecting from a stock of printed irises of different colors and sizes one which matches the remaining natural eye of the person being fitted. Thus instead of maintaining, as is customary in the case of artificial eyes made of glass, a large number, i. e. thousands, of eyes of different sizes and shapes having irises of different sizes and colors, one may maintain only a relatively small stock of the body members above described and a suitable stock of irises. The possibility of associating a selected iris with a selected body member, as will be apparent, greatly reduces the number of such parts required to be kept in stock as compared with glass artificial eyes, because in the case of glass eyes each body member is permanently fixed to a particular iris, and cannot be altered in any way to make it fit, whereas according to the present invention each iris of a stock thereof may be used with each body member of the stock thereof, and the latter is capable of being altered to fit. A particularly advantageous feature of the present invention is that the body member or ball of the eye may be specially molded to measure from resin which may be colored to an exact match of the color of the natural eye of the person to be fitted, or a blank which is approximately of the proper size, shape and color, may be accurately fitted by cutting, grinding or adding material, and an iris may be provided which is as nearly an exact duplication of the iris of the remaining natural eye of the person being fitted as may be desired; for instance, a color photograph of the natural eye may be taken and accurately reproduced by printing, and the so provided ball and iris may be combined and provided with a transparent cornea to produce an artificial eye which is hardly distinguishable from the natural eye. In the making of such an artificial eye the ball may, of course, be provided with vein lines to match the natural eye of the person being fitted. The invention provides the further advantage that the artificial eye so made is permanent, since it is not subject to wear or erosion and breakage as is the case with an artificial eye made of glass, and further that the artificial eye may be duplicated.

Referring again to the drawing, 1 is the body member or ball made of translucent and suitably colored thermoplastic material, such as a resin formed by the conjoint polymerization of 80 parts of vinyl chloride with 20 parts of vinyl acetate in the presence of benzoyl peroxide (see U. S. Patent No. 1,932,889). The thickness of the walls of the shell preferably is about one eighth of an inch. A portion of the rear wall of the shell is cut away, leaving the projection 2. The front surface of the shell is provided with a flat or slightly rounded area 3 to receive the iris 4, and with vein lines 5 as described above. 6 is the cornea and is a layer of transparent resin covering the entire front of the ball 1 and is thickened and rounded over the iris to give a natural appearance to the artificial eye. This cornea layer preferably is applied in the form of a previously molded shell, i. e. the iris 4 is laid on the area 3 of the ball 1, the transparent shell 6, which may only approximately fit, is applied and the assembly is placed in a mold and heated sufficiently to render the resin plastic and adhesive and cause the cornea layer 6 to shape itself to and weld to the ball 1. Due to the thermoplastic character of the resin a perfect weld may be secured leaving no line of demarcation between the cornea layer and the ball. Finally the artificial eye is trimmed and polished and is ready for use.

Summarizing the foregoing it is noted that the invention resides primarily in the construction of an artificial eye out of a suitable thermoplastic material in two parts, i. e. the body member or ball of translucent material and the cornea of transparent material into which construction an iris which may be made on paper or the like is incorporated. This method of construction and the use of the materials specified permits a practically perfect fitting of an artificial eye to any individual person with respect to size, shape, color, amount and distribution of veins, color and size of iris, size of pupil and shape of the transparent front of the eye or cornea, and the resulting artificial eye is practically nonbreakable, does not shrink or warp or change color, is not injured by cleaning, does not deteriorate in use, is non-absorbent and therefore sanitary, is non-inflammable and light in weight, is capable of being altered or repaired and has a remarkably lifelike appearance.

I claim:

1. An artificial eye formed of a thermoplastic resinous material and having an iris incorporated therein consisting of a coloring material deposited on paper.

2. A method of making an artificial eye which comprises molding the ball portion of the eye of a translucent thermoplastic material, covering the front of said ball member with a layer of transparent thermoplastic material, supporting an iris member between said ball member and said transparent layer and welding the ball member to said transparent layer.

3. An artificial eye comprising a ball portion formed of a translucent thermoplastic artificial resin welded to a relatively thin layer of a transparent thermoplastic artificial resin and an iris member embedded between said ball portion and said layer.

4. An artificial eye as defined in claim 1 in which the thermoplastic resinous material is a polymerized olefine derivative.

5. An artificial eye as defined in claim 1 in which the thermoplastic resinous material is a vinyl resin.

6. An artificial eye as defined in claim 1 in which the thermoplastic resinous material is a vinyl resin formed by the conjoint polymerization of vinyl acetate and vinyl chloride.

7. Method as defined in claim 2 in which the thermoplastic material is an artificial resinous material.

8. Method as defined in claim 2 in which the thermoplastic material is a polymerized olefine derivative.

9. Method as defined in claim 2 in which the thermoplastic material is a vinyl resin.

10. Method as defined in claim 2 in which the thermoplastic material is a vinyl resin formed by the conjoint polymerization of vinyl acetate and vinyl chloride.

11. An artificial eye as defined in claim 3 in which the thermoplastic artificial resin is a polymerized olefine derivative.

12. An artificial eye as defined in claim 3 in which the thermoplastic artificial resin is a vinyl resin.

13. An artificial eye as defined in claim 3 in which the thermoplastic artificial resin is a vinyl resin formed by the conjoint polymerization of vinyl acetate and vinyl chloride.

JAMES L. TRAVERS.